(12) United States Patent
Desany et al.

(10) Patent No.: US 7,747,539 B2
(45) Date of Patent: Jun. 29, 2010

(54) CONTACTLESS-CHIP-INITIATED TRANSACTION SYSTEM

(75) Inventors: David Desany, Lake Mary, FL (US); Thomas Gandre, Longwood, FL (US)

(73) Assignee: First Data Corporation, Englewood, CO (US)

(*) Notice: Subject to any disclaimer, the term of this patent is extended or adjusted under 35 U.S.C. 154(b) by 1193 days.

(21) Appl. No.: 11/339,319

(22) Filed: Jan. 24, 2006

(65) Prior Publication Data

US 2007/0170243 A1 Jul. 26, 2007

(51) Int. Cl.
G06Q 20/00 (2006.01)
(52) U.S. Cl. .............................. 705/67; 705/50; 705/51
(58) Field of Classification Search .................. 705/67, 705/50, 51
See application file for complete search history.

(56) References Cited

U.S. PATENT DOCUMENTS

| 5,764,789 | A * | 6/1998 | Pare et al. ................... 382/115 |
| 5,805,719 | A | 9/1998 | Pare et al. |
| 6,678,664 | B1 | 1/2004 | Ganesan |
| 2003/0009382 | A1 | 1/2003 | D'Arbeloff et al. |
| 2003/0085286 | A1 | 5/2003 | Kelley et al. |
| 2003/0140007 | A1 | 7/2003 | Kramer et al. |
| 2004/0138989 | A1 | 7/2004 | O'Malley |
| 2004/0260607 | A1 | 12/2004 | Robbins et al. |
| 2005/0137986 | A1 * | 6/2005 | Kean ............................ 705/65 |
| 2006/0085357 | A1 * | 4/2006 | Pizarro ......................... 705/64 |
| 2007/0078781 | A1 * | 4/2007 | Kean ............................ 705/67 |
| 2007/0170243 | A1 * | 7/2007 | Desany et al. ............... 235/379 |

OTHER PUBLICATIONS

Zaxus Host Security Module RG7000 Operations and Installations Manual 1270A513 Issue 3, Zaxus Limited, Copyright 1987-2000, downloaded from http://cryptome.org/gag/HSM_Programmers_Manual_-1270A514-3.pdf.

* cited by examiner

*Primary Examiner*—Pierre E Elisca
(74) *Attorney, Agent, or Firm*—Townsend and Townsend and Crew LLP

(57) ABSTRACT

Methods and apparatus process a financial transaction initiated by a consumer with a contactless transaction device. An electromagnetic transmission identifying a financial account and an adjunct identifier is received from the device. Transaction data are electromagnetically transmitted to the device. Another electromagnetic transmission providing authentication data and a digital signature originated from the transaction data is received from the device. The device is authenticated with an analysis of the authentication data and digital signature. An authorization request for approval of the financial transaction is transmitted over a payment network to an issuer system, and a response is received. The adjunct identifier is transmitted to an adjunct system distinct from the issuer system for implementation of functions adjunct to the financial transaction. The financial transaction is acted on in accordance with the response to the authorization request.

26 Claims, 4 Drawing Sheets

CONTACTLESS-CHIP-INITIATED TRANSACTION SYSTEM

BACKGROUND OF THE INVENTION

This application relates generally to transaction systems. More specifically, this application relates to a transaction system that uses contactless chip initiation.

Contactless transaction initiation is often performed with a "smart" card. Such a card typically includes radio-frequency identification ("RFID") components for contactless communication with a point-of-sale device, a chip, and a magnetic stripe that permits the card also to be used in a conventional magnetic-stripe card reader. The information communicated via the RFID components is generally similar or identical to the information recorded on the magnetic stripe. Payment systems that use contactless cards are generally restricted to provided a mechanism for a payment channel. In some systems, payment requests are routed through a conventional debit or credit authorization network, while in other systems, payment requests are processed offline by the card, which includes a "stored value" account balance. These offline cards are sometimes referred to in the art as "electronic wallets," "e-wallets," "electronic purses," or "e-purses."

Other types of stored-value cards, commonly sold as gift cards, are associated with a centralized and remote stored-value account. Such cards are typically not contactless, but are instead simple plastic cards with magnetic stripes. The remote account is charged when the card is used through an exchange of information over a network, and can often be replenished by the cardholder or a third party. When the card is used, an account number comprised by the card permits access to the account. These cards also typically provided only a single payment channel, with all payment requests being directed to the remote account that stores the account balance.

BRIEF SUMMARY OF THE INVENTION

Embodiments of the invention provide methods and apparatus for contactless initiation of transaction processing. In a first set of embodiments, methods are provided of processing a financial transaction initiated by a consumer with a contactless transaction device. A first electromagnetic transmission is received from the contactless transaction device. The first electromagnetic transmission provides an identification of a financial account and an adjunct identifier. Transaction data defining aspects of the financial transaction are electromagnetically transmitted to the contactless transaction device. A second electromagnetic transmission is received from the contactless transaction device. The second electromagnetic transmission provides authentication data and a digital signature originated from the transaction data through application of a cryptographic key maintained on the contactless transaction device. The contactless transaction device is authenticated with an analysis of the authentication data and digital signature. An authorization request for approval of the financial transaction is transmitted over a payment network to an issuer system maintained by or on behalf of an issuer who maintains the financial account. A response to the authorization request is received from the issuer system. The adjunct identifier is transmitted to an adjunct system distinct from the issuer system for implementation of functions adjunct to the financial transaction. The financial transaction is acted on in accordance with the response to the authorization request.

The first electromagnetic transmission may comprise a number assigned to the contactless transaction device, with a first portion of the number comprising the identification of the financial account and a second portion of the number comprising the adjunct identifier. For example, the identification of the financial account could comprise a bank identification number and a primary account number. In such an embodiment, the cryptographic key may be one of a plurality of private keys of respective asymmetric-cryptography public-key-private-key pairs assigned to the bank identification number. For instance, the one of the plurality of private keys may be defined by a digit of the PAN. Alternatively, the cryptographic key may be a private key of an asymmetric-cryptography public-key-private-key pair associated with all accounts associated with the bank identification number.

In some embodiments, the authentication data may comprise a pattern resulting from application of a hashing algorithm to the transaction data, with the cryptographic key being a private key of an asymmetric-cryptography public-key-private-key pair. The digital signature may then comprise a result of encrypting the pattern with the private key. The contactless transaction device is then authenticated by applying the hashing algorithm to the transaction data to calculate a comparison hash value. The digital signature is decrypted with the public key, permitting a comparison of the decrypted digital signature with the comparison hash value. In one embodiment, the cryptographic key is a private key of an asymmetric-cryptography public-key-private-key pair associated uniquely with the financial account.

In one embodiment, the adjunct system comprises a loyalty system that maintains records for providing rewards to the consumer for defined transaction activity. The method may further include receiving a response from the adjunct system related to implementation of the functions adjunct to the financial transaction. In one such instance, the financial transaction is modified according to the response received from the adjunct system.

Examples of financial transactions that may be implemented with embodiments of the invention include a credit transaction that increases an outstanding balance of the financial account and a debit transaction that decreases a balance of the financial account. In one embodiment, the contactless transaction device comprises a magnetic stripe, with the identification of the financial account being encoded on the magnetic stripe.

The above methods of the invention may be implemented with a transaction processing system that comprises a point-of-sale device equipped to exchange electromagnetic communications with a contactless transaction device and a point-of-sale processing system in communication with the point-of-sale device. The point-of-sale device and the point-of-sale processing system include instructions for implementing methods of the invention.

In a second set of embodiments, methods are also provided of processing a financial transaction with a contactless transaction device. A first electromagnetic transmission is transmitted from the contactless transaction device to a transaction processing system. The first electromagnetic transmission provides an identification of a financial account to support the financial transaction at an issuer system and an adjunct identifier to be used in implementing functions adjunct to the financial transaction on an adjunct system distinct from the issuer system. Transaction data defining aspects of the financial transaction are electromagnetically received from the transaction processing system with the contactless transaction device. Authentication data are derived from the received transaction data. A digital signature is originated from the received transaction data through application of a cryptographic key maintained on the contactless transaction device.

A second electromagnetic transmission is transmitted from the contactless transaction device to the transaction processing system. The second electromagnetic transmission provides the authentication data and the digital signature.

The first electromagnetic transmission may comprise a number assigned to the contactless transaction device. A first portion of the number comprises the identification of the financial account and a second portion of the number comprises the adjunct identifier. The identification of the financial account may comprise a bank identification number and a primary account number. In one such embodiment, the cryptographic key is one of a plurality of private keys of respective asymmetric-cryptography public-key-private-key pairs assigned to the bank identification number. For instance, the one of the plurality of private keys may be defined by a digit of the primary account number. In another such embodiment, the cryptographic key is a private key of an asymmetric-cryptography public-key-private-key pair associated with all accounts associated with the bank identification number.

Derivation of the authentication data from the received transaction data may comprise deriving a pattern by applying a hashing algorithm to the transaction data. If the cryptographic key is a private key of an asymmetric-cryptography public-key-private-key pair, the digital signature may then be originated from the received transaction data by encrypting the pattern with the private key.

In certain embodiments, the contactless transaction device comprises a magnetic stripe, with the identification of the financial account being encoded on the magnetic stripe.

These various methods may be embodied in a contactless transaction device that comprises a support structure, an antenna, and a microprocessor chip. The antenna and microprocessor chip are maintained in position by the support structure. The microprocessor chip stores an identification of a financial account to support a financial transaction at an issuer system, an adjunct identifier to be used in implementing functions adjunct to the financial transaction on an adjunct system distinct from the issuer system, and a cryptographic key. The microprocessor chip also includes instructions to process a financial transaction by using this stored information as described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Figure 1:
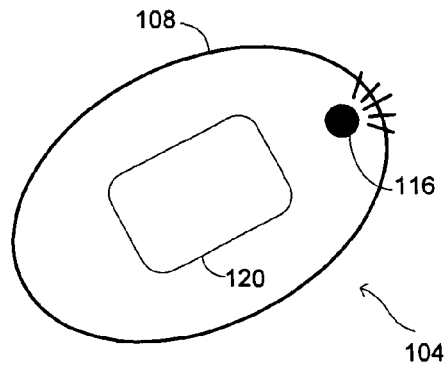
FIG. 1 is a schematic illustration of an RFID transaction device in one embodiment in the form of key fob.

Embodiments of the invention permit integration of transaction systems with loyalty and other types of systems adjunct to the transaction systems, and may additionally provide specialized digital signature security. In traditional arrangements, loyalty programs are implemented with separate loyalty systems in which consumers are provided with magnetic-stripe plastic cards that contain a unique identifier, which could be a telephone number of the consumer or other value assigned by a merchant. These traditional loyalty cards are not useable for payment purposes. When a consumer makes a purchase at a merchant using such a traditional loyalty system, the consumer separately effects the purchase and loyalty functions. To obtain loyalty credit, the consumer provides the loyalty card to the merchant, who uses the consumer identifier as a key for back-office merchant functions. These functions include recording the consumer purchases and calculating potential loyalty "rewards" based on merchant-defined business logic. Such traditional arrangements typically do not use contactless devices and provide only a discrete mechanism for support of the loyalty program without supporting interfaces to payment systems.

Embodiments of the invention permit such integration by providing consumers with contactless transaction devices, each of which includes a chip. The chip may be an RFID chip and include traditional magnetic-stripe data, a customer identifier, and a private key. This combination of information advantageously permits the contactless transaction device to support a traditional payment transaction with specialized digital signature security, as well as to permit automatic identification of the consumer for integration with adjunct systems using the techniques described in detail below.

In describing embodiments of the invention, reference is sometimes made to terms having specific intended meanings. For example, as used herein, an "RFID chip" is any microprocessor device configured to exchange data electromagnetically. While it is generally anticipated that such electromagnetic data communications will take place at radio frequencies, this is not a requirement and the electromagnetic data exchanges may take place at any frequency.

A "Bank Identification Number" or "BIN" refers to a number assigned by an issuer of contactless transaction devices to a group of such contactless transaction devices. In some instances, the BIN is assigned based on product characteristics, such as where a different BIN is used by a single issuer of "gold," "platinum," and "business" products to distinguish those products and the overall levels of service that accompany the different products.

A "payment network" refers herein to an infrastructure that supports that exchange of data in implementing payment transactions. It is anticipated that the data exchange will typically proceed between merchants and financial institutions. Examples of existing commercial networks that are included within the definition of "payment network" include the STAR/MAC network, the NYCE® network, the VISA® network, and the MasterCard® network. Access to a network by a consumer is typically achieved through entry of a secret code, such as a personal identification number ("PIN"), in combination with data extracted from the contactless transaction device. In some embodiments, a signature of the consumer may be used in lieu of a secret code. In some instances, particularly in support of transactions having a low value, a consumer might be permitted access to the payment network with only information extracted from the contactless payment device, without the need to provide a PIN or signature.

A "point-of-sale device" or "POS device" refers herein to any physical device situated at a location where a consumer may provide payment in support of a transaction. Such physical locations are typically merchant locations, such as where the POS device is operated by a clerk or is available for self-operation by the consumers, but may also be in other locations. For instance, certain automatic teller machines "ATMs" may be equipped to support transactions for the sale of movie or sporting-event tickets even remote from the merchant location; other similar types of transactions that may be performed with a POS device at a location remote from the merchant will also be evident to those of skill in the art. In some cases, a personal computer equipped with the appropriate structure may be used as a POS device even when located on the consumer premises. Examples of POS devices thus include, without limitation, personal computers, cash registers, and any devices capable of reading a magnetic stripe or RFID chip for the purpose of initiating a transaction.

A "POS processing system" refers to a computational system used by merchants to control communications between POS devices and payment networks. Such systems may be run internally by merchants, may be run by merchant consortia, or may be outsourced to service providers in different embodiments.

A "primary account number" or "PAN" refers to a number assigned to an account, to a contactless payment device, or to both the account and the contactless transaction device. The PAN is generally assigned by the issuer of the contactless payment device. In most embodiments, it is anticipated that the PAN will identify an account associated with the contactless transaction device and be include as data stored by the RFID chip comprised by the contactless transaction device, but in other embodiments surrogates may be used in combination with mapping tables to correlate individual accounts with respective contactless transaction devices. Identification of the PAN permits a financial institution that maintains the account to make a unique identification of the consumer initiating a payment transaction and determine which of potentially several accounts is to be used in supporting the transaction. For instance, where a single consumer maintains debit, credit, and stored-value accounts with a single financial institution, the PAN may be used by the financial institution to discriminate among these accounts. In embodiments where the transaction system is integrated with an adjunct system like a loyalty system, the PAN is generally expected to be distinct from any identifier used by the adjunct system.

Figure 2A:
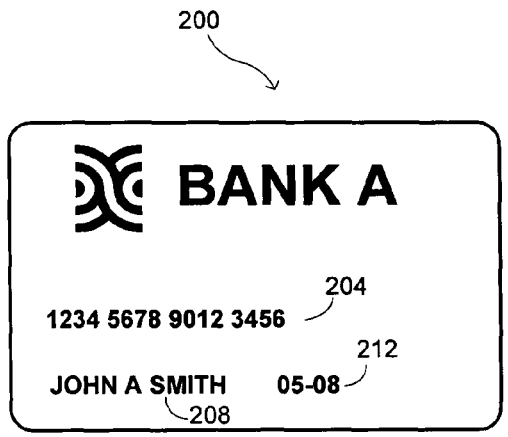
FIGS. 2A and 2B are respectively front and back views of an RFID transaction device in another embodiment in the form of a card.

Embodiments of the invention are not limited to a particular form for the contactless transaction device, and examples of devices that may be used in some embodiments are shown schematically in FIGS. 1 and 2A/2B. In FIG. 1, the contactless transaction device comprises a key fob 104 that includes an RFID chip that may store the data combination described in detail below. The fob 104 itself may include a housing 108 having an activation button 120 and enclosing a transponder 116 that is in electrical communication with the RFID chip. An indicator 116 may be provided, such as in the form of a visual indicator like an LED or in the form of an audio indicator. When the fob 104 is provided near an electromagnetic reader and activated with the activation button 120, the indicator may be activated to indicate that data are accessible from the RFID chip. As previously noted, the RFID chip may operate at radio frequencies, although reference to the chip as an "RFID chip" is not intended to limit the invention to any particular region of the electromagnetic spectrum.

Figure 2B:
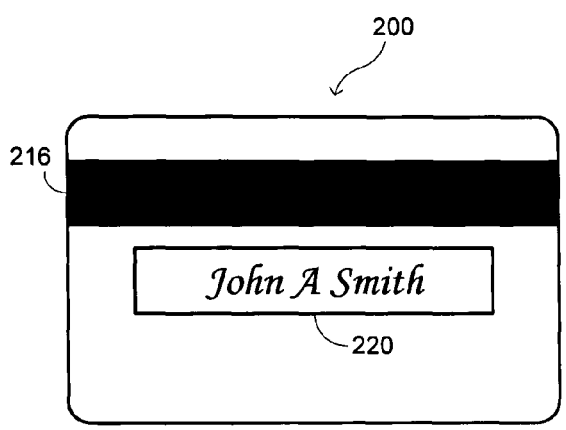

FIGS. 2A and 2B provide an illustration of an alternative embodiment in which the contactless transaction device comprises a card 200, with FIG. 2A showing a front view of the card 200 and FIG. 2B showing a back view of the card 200. The card may be made of plastic and include embossed information on the front, shown in FIG. 2A as including an identification number 204, a name of the cardholder 208, and an expiration date 212. The identification number may in turn comprise a BIN and PAN used to identify the issuer and a respective account that in used in support of transactions initiated with the card 200. In typical embodiments, the first six through nine digits of the identification number 204 comprise the BIN, but in other embodiments different portions of the identification number 204 comprise the BIN. The PAN may similarly by comprised by a subset of the digits of the identification number 204. The back of the card 200 shown in FIG. 2B may include a magnetic stripe 216 and a signature space 220 to record the signature of the cardholder. Data are stored on the magnetic stripe in accordance with standardized protocols. An RFID chip is additionally embedded into the card 200 to enable data to be exchange with the card 200 in a contactless fashion.

Figure 3:
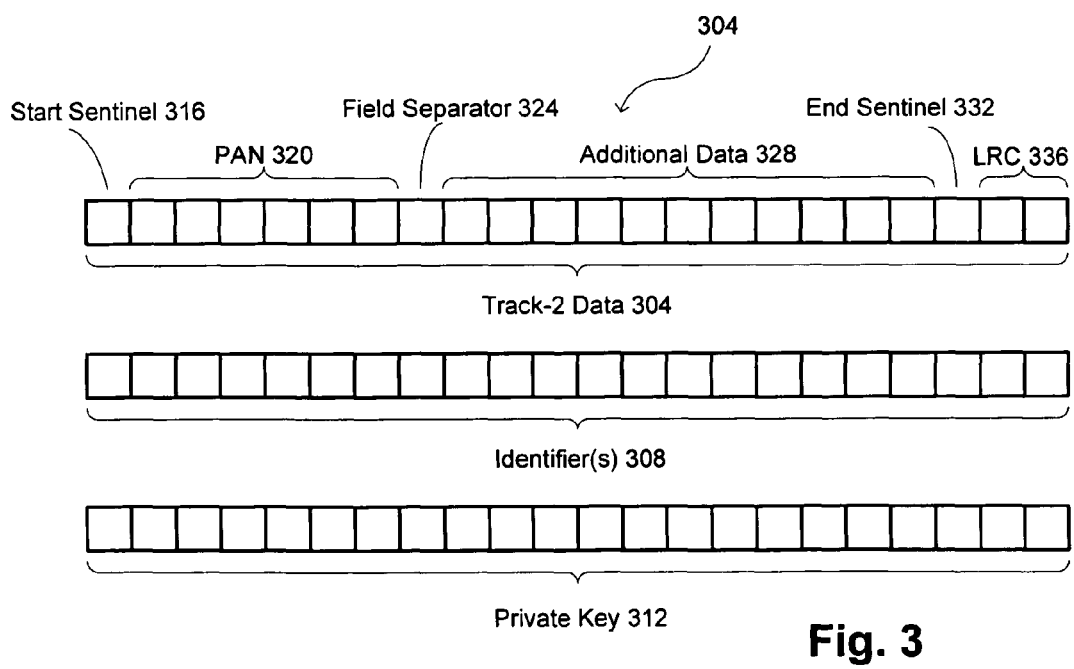
FIG. 3 illustrates a data structure for data maintained on a chip comprised by an RFID transaction device in embodiments of the invention.

Irrespective of the form of the contactless transaction device, whether it be a key fob 104 as shown in FIG. 1, a card 200 as shown in FIGS. 2A and 2B, or have some other structure, embodiments of the invention provide for the maintenance of certain data by the RFID chip comprised by the contactless transaction device. One possible structure for such data is shown in FIG. 3, with the data structure 304 divided into three distinct groups. While the drawing shows each of the groups to have the same size, this is not a requirement of the invention and, indeed, it is generally anticipated that the groups will have different data sizes. Furthermore, the invention is not limited to any particular form in which the data are to be stored. One convenient form, illustrated in the drawing, is for storage as a linear string, with the second and third strings being separated from their otherwise contiguous nature with the first string for purposes of illustration.

One set of data comprised by the RFID device thus includes transaction-system data. Such data is the data to be used by the payment system in processing a request for execution of a transaction to be supported by an account identified by the contactless transaction device. Identification of the account is this a component of the transaction-system data. In some embodiments, this first set of data includes traditional magnetic-stripe data, particularly "track-2" data, and is structured according to the conventional formats for magnetic-stripe data. A magnetic stripe comprised by a conventional magnetic-stripe data includes three "tracks" on which data may be stored according to specified formats. The "track-1" and "track-2" data are formatted as described in ISO 7813, the entire disclosure of which is incorporated herein by reference for all purposes, and the "track-3" data are formatted as described in ISO 4090, the entire disclosure of which is also incorporated herein by reference for all purposes. The track-1 data is specified by the International Air Transport Association and generally stores more information than track 2, which is specified by the American Banking Association; track 3 is used less commonly.

Thus, in some embodiments of the invention, the first set of data comprised by the RFID device corresponds to the track-2 magnetic-stripe data. This includes a start sentinel 316, which is often the character ";". The PAN 320 is identified after the start sentinel 316 and is terminated by a field separator 324, which is often the character "=". An "additional data" field 328 is demarcated by the field separated 324 and an end sentinel 332, which is often the character "?". The "additional data" comprised by field 328 may include such information as the expiration date, an offset, an encrypted PIN, and the like. These data are followed by a longitudinal redundancy check field 336 that permits certain consistency checks to be made of the stored data. Irrespective of the precise structure of this first set of data, in many embodiments this first set of data corresponds identically to the data stored on the magnetic stripe of a conventional transaction card. In embodiments where the contactless transaction device does not include a magnetic stripe, such as when it comprises a key fob, storage of this conventional magnetic-stripe data is instead performed by the RFID chip. In embodiments where the contactless transaction device does include a magnetic stripe, such as when it comprises a card like that shown in FIGS. 2A and 2B, the data stored on the magnetic stripe may be duplicated on the RFID chip.

The second set of data may include one or more identifiers 308 to be used by systems adjunct to the transaction system. For example, in embodiments where the adjunct system comprises a loyalty system, the identifier 308 may comprise any character string used by the loyalty system to identify a particular loyalty program. As previously noted, this may comprise a telephone number of the consumer, a string assigned by a merchant, or any other suitable identifier.

The third set of data may include a private key 312 of a cryptographic public/private key pair. As will be explained below, the private key may be used in implementing certain security features, including the origination of a digital signature. In particular, embodiments of the invention provided for origination of a digital signature through calculation of a message digest, such as in the form of a hash value, followed by subsequent encryption of the message digest. Such encryption may be performed with the private key 312 stored by the RF device, with the resulting ciphertext defining the digital signature. As used herein, variants of the term "to generate" a digital signature refer to the process of encrypting the message digest; variants of the term "to originate" a digital signature refer to processes that include both the calculation of the message digest and the generation of the digital signature from the message digest.

Digital signatures originated in accordance with embodiments of the invention may be appended to any electronic communication as a mechanism for authenticating the source of the electronic communication. Merely by way of example, a message digest for an electronic communication could be calculated in a specific embodiment by applying a hashing algorithm like the SHA-1 algorithm to the message itself. This may done irrespective of the specific content of the message, whether it be a request for access to information or to a physical area, part of a financial transaction such as an instruction to transfer funds, part of a legal action such as the delivery of an executed contract, or the like. The hashing algorithm itself may be applied within the contactless transaction device by the RFID chip, or could alternatively be performed by a device external to the contactless transaction device, with the resulting hash value being transmitted to the contactless transaction device for generation of the digital signature. To authenticate the message in this example, a recipient of an electronic communication signed with the digital signature must know or be able to obtain both (1) the identity of the hashing algorithm applied to the message and (2) the public key corresponding to the private key used to encrypt message digest. With such information, the recipient may apply the appropriate hashing algorithm to the received message to calculate a comparison hash value, and may decrypt the digital signature using the public key. If the comparison has value calculated by the recipient is equal to the hash value of the decrypted digital signature, then the recipient confirms that the content of the message contained in the electronic communication was not altered in transmission; such an alteration would cause a change in the hash value that would be detected when comparing the comparison hash value with the decrypted version of the digital signature.

In performing message authentication, the recipient also authenticates the identity of the sender of the electronic communication, insomuch as the recipient thereby confirms that the sender of the electronic communication possessed the private key corresponding to the public key used successfully to authenticate the message. This is an example of a more general class of entity authentication techniques based on confirming the authenticity of what is in the possession of the sender.

Irrespective of its specific form, a contactless transaction device that maintains the information described in connection with FIG. 3 may be used for a variety of different financial transactions. For example, it may be used to make payments at merchants instead of using cash or some other payment mechanism, may be used as a debit device for larger purchases, may be used to access loyalty or other adjunct functionality, and the like. In particular, embodiments of the invention enable the same payment transaction to be used both by a transaction system to provide payment for the transaction and by loyalty system to record transaction activity and/or calculate loyalty-based rewards.

Figure 4A:
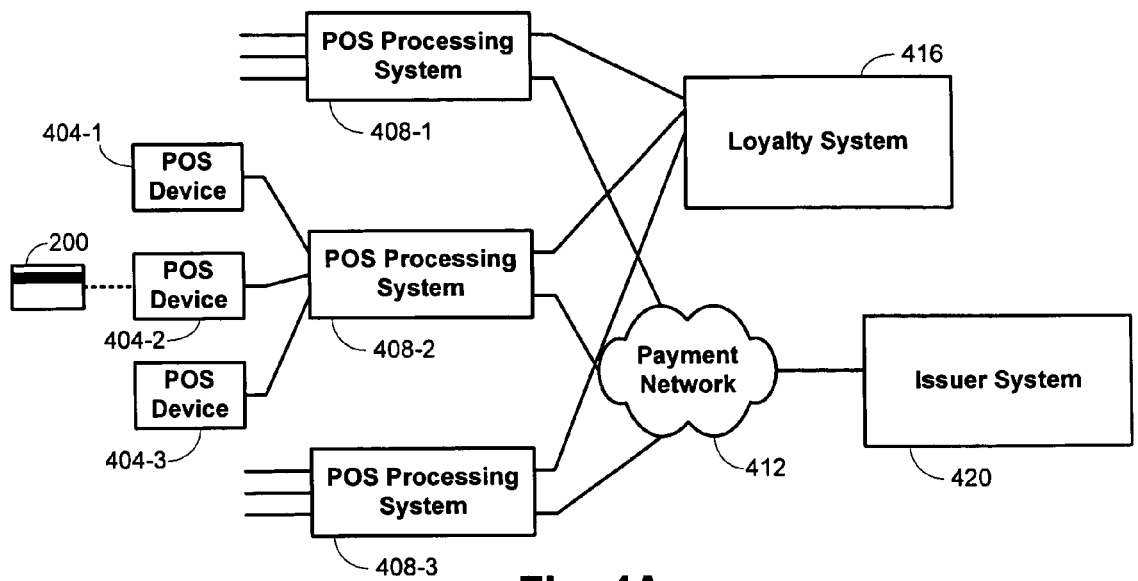
FIG. 4A provides a schematic illustration of an infrastructure over which transaction information may be communicated in accordance with embodiments of the invention.

One type of infrastructure that may be used in such implementations is shown schematically in FIG. 4A, although other infrastructures that provide mechanisms for the exchange of electronic communications among the relevant parties may be used in alternative embodiments. The infrastructure includes a payment network 412 over which transaction information is routed to obtain approval for transactions transmitted back to merchants and to be used in settlement functions to give effect to the transactions. The payment network is provided in communication with an issuer system 420 that processes requests from merchants transmitted over the payment network 412. The payment network 412 is also provided in communication with one or more POS processing systems 408, each of which is itself provided in communication with one or more POS devices 404.

Each of the POS devices 404 is equipped for contactless communication with contactless transaction devices. While the drawing shows an example where the contactless transaction device comprises a card 200 having an embedded RFID chip, any suitable contactless transaction device may be used with a POS device 404 having the appropriate communications capabilities. The POS devices 404 may also be equipped for other types of communication with transaction devices, such as with magnetic-stripe readers, optical readers, magnetic-ink readers, and the like. Examples of devices that have such varied functionality are described in the following commonly assigned applications, the entire disclosures of which are incorporated herein by reference for all purposes: U.S. Provisional Patent Application No. 60/147,889, entitled "INTEGRATED POINT OF SALE DEVICE," filed Aug. 9, 1999 by Randy J. Templeton et al.; U.S. patent application Ser. No. 09/634,901, entitled "POINT OF SALE PAYMENT SYSTEM," filed Aug. 9, 2000 by Randy J. Templeton et al.;

U.S. patent application Ser. No. 10/116,689, entitled "SYSTEMS AND METHODS FOR PERFORMING TRANSACTIONS AT A POINT-OF-SALE," filed Apr. 3, 2002 by Earney Stoutenburg et al.; U.S. patent application Ser. No. 10/116,733, entitled "SYSTEMS AND METHODS FOR DEPLOYING A POINT-OF-SALE SYSTEM," filed Apr. 3, 2002 by Earney Stoutenburg et al.; U.S. patent application Ser. No. 10/116,686, entitled "SYSTEMS AND METHODS FOR UTILIZING A POINT-OF-SALE SYSTEM," filed Apr. 3, 2002 by Earney Stoutenburg et al.; and U.S. patent application Ser. No. 10/116,735, entitled "SYSTEMS AND METHODS FOR CONFIGURING A POINT-OF-SALE SYSTEM," filed Apr. 3, 2002 by Earney Stoutenburg.

As FIG. 4A also notes, each of the POS processing systems may also be in communication with one or more adjunct systems, the example of which is shown in the drawing is a loyalty system 416.

Figure 4B:
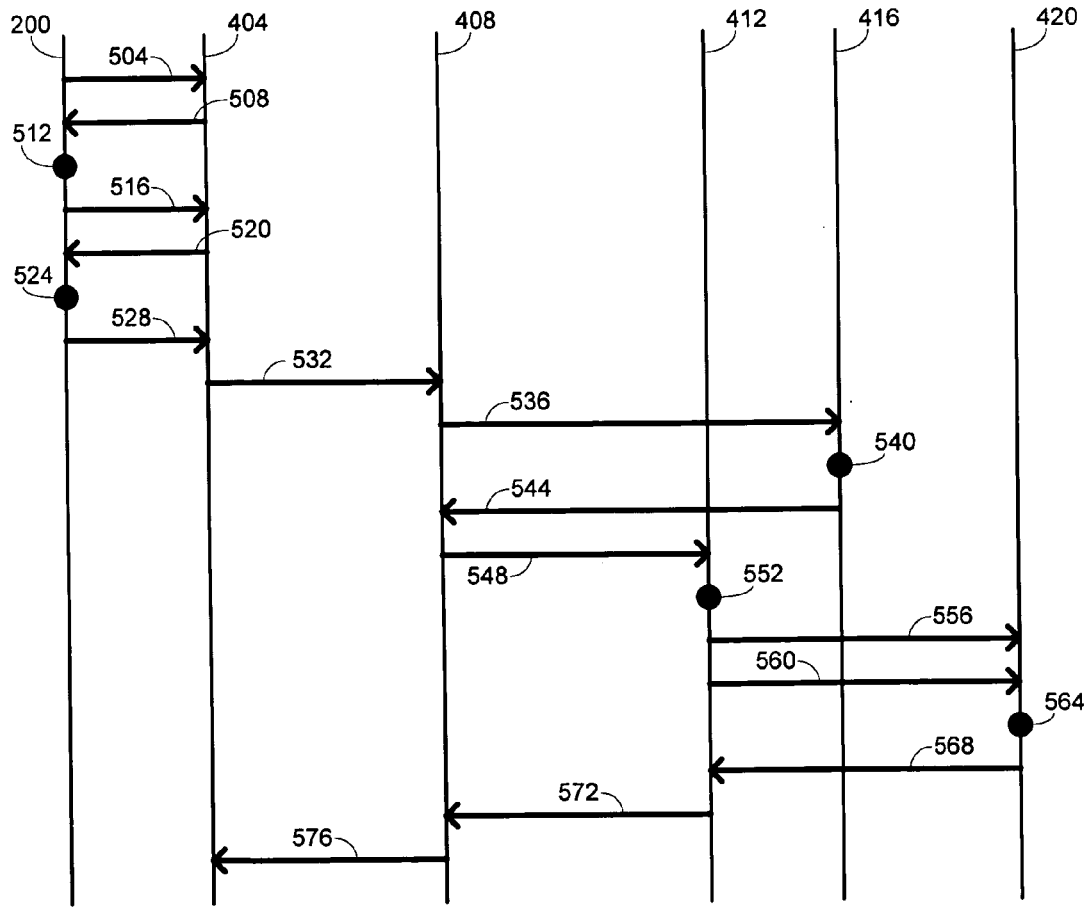
FIG. 4B illustrates how information is exchanged over the infrastructure of FIG. 4A in implementing certain methods of the invention.
Figure 5:
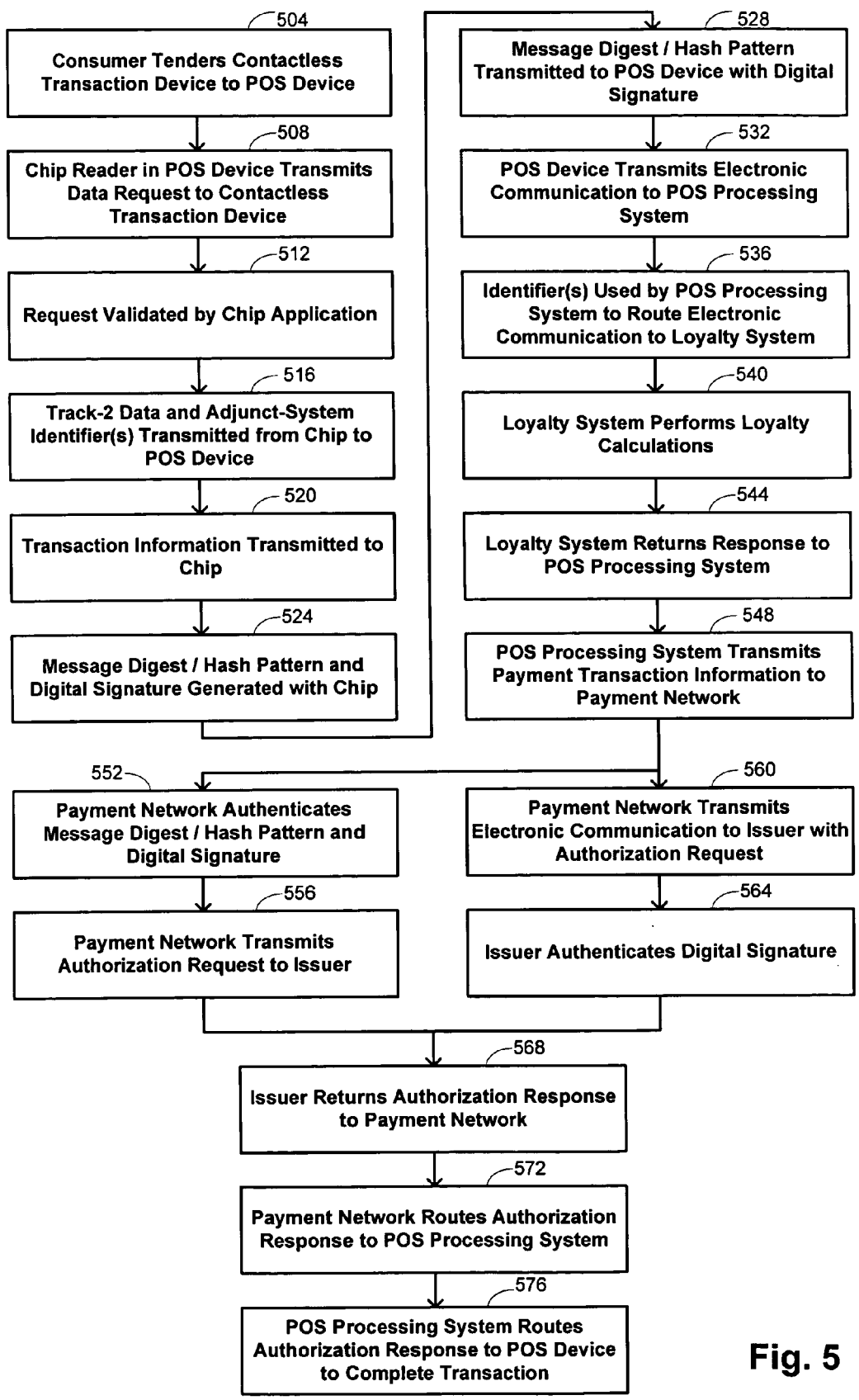
FIG. 5 is a flow diagram summarizing various methods of the invention corresponding to the information exchange illustrated in FIG. 4B.

FIG. 4B provides a schematic illustration of how methods for processing transactions may be implemented through a series of electronic communications among the structural elements of FIG. 4A. The vertical lines in FIG. 4B correspond to these structural elements and the horizontal arrows correspond to electronic communications transmitted among the structural elements. A filled circle superimposed over one of the vertical lines identifies a process performed by the corresponding one of the structural elements, usually to process an electronic communication that has been received or to prepare an electronic communication to be sent. Each of the horizontal arrows and filled circles is identified with a reference number that corresponds to an identification of a block in the flow diagram FIG. 5. This flow diagram summarizes various aspects of the invention to process a transaction. FIG. 4B thus illustrates the flow of data used in implementing the corresponding blocks of the flow diagram of FIG. 5.

Methods of the invention may accordingly begin at block 504 with a consumer tendering the contactless transaction device 200 to a POS device 404 in support of a transaction. This may be done by waving or tapping the contactless transaction device 200 in front of the POS device 404, the action taken perhaps depending on the specific structure of the devices. A chip reader comprised by the POS device 404 responds by initiating power-up of the RFID chip comprised by the contactless transaction device and transmitting a data request to the contactless transaction device at block 506. The request is validated by a chip application at block 512, permitting the contactless transaction device 200 to transmit data stored by the RFID chip to the POS device 404 at block 516. These data include the magnetic-stripe track-2 data, such as the BIN, PAN, expiration date, and the like. In addition, the data transmitted to the POS device 404 may include any adjunct-system identifiers, such as identifiers to be used by a loyalty system, that are stored on by the chip in field 308. Validation of the request from the POS device 404 by the chip application is performed n accordance with a validation scheme defined by the payment network 412 and/or by financial institutions that issue the contactless transaction devices 200.

As indicated at block 520, the POS device transmits specific transaction information to the RFID chip of the contactless transaction device 200. The transaction information is of a character that is unique to the transaction and is used by the RFID chip at block 524 to generate a message digest in the form of a digest of the transaction information, and to generate a hash pattern of the message digest. A digital signature is generated from the hash pattern, the entire process thus originating a digital signature using the received transaction information. At block 528, the message digest/hash pattern is transmitted from the contactless transaction device 200 to the POS device 404. These data are included in a payment message that is formatted as an electronic communication transmitted from the POS device 404 to the POS processing system 408 at block 532. The electronic communication received by the POS processing system may thus include the transaction information, the message digest/hash pattern, the digital signature, and the identifiers for any adjunct systems.

The POS processing system 408 extracts the identifier(s) from the electronic communication at block 536 and routes the electronic communication to the adjunct system for processing, the adjunct system comprising the loyalty system 416 in the illustrated example. In the case where the adjunct system comprises a loyalty system 416, the system 416 performs loyalty calculations at block 540, using a defined business logic to assess progress towards and/or achievement of certain rewards. An appropriate response may be returned back from the loyalty system 416 to the POS processing system 408 at block 544.

In addition, the POS processing system 408 routes the payment transaction information to the payment network 412 for processing at block 546. In some alternative embodiments, the payment network 412 may alternatively receive the transaction information from the adjunct system, which acts as an intermediary in a sequential arrangement instead of on a separate path of a parallel arrangement like that illustrated in the drawings. The transaction information is transmitted to the payment network 412 as part of an authorization request, the authorization request additionally including the message digest/hash pattern and digital signature unique to the transaction.

There are a number of different ways in which the authorization request may then be handled. For example, in one embodiment, the payment network 412 itself performs an authentication of the message digest/hash pattern at block 552 by using the appropriate public key associated with the private key assigned to the specific contactless transaction device 200. The authentication method used by the payment network 412 may reflect an agreement between the payment network 412 and issuer system 420 for deriving the private keys. One example of such an arrangement may assign a unique private key for each PAN. Another example might assign some predetermined number of private keys, say ten, to each BIN; the derivation of the specific private key to be used may thus be identified by a digit of the PAN, a convenient one of which is the last digit because it usually acts as a check digit. In still another example, a single private key may be assigned to an entire BIN range of contactless transaction devices. Irrespective of how the private keys are determined, once the authentication of the message digest/hash pattern and digital signature are completed, the authorization request is transmitted to the issuer system 420 at block 556.

In other embodiments, rather than perform the authentication itself, the payment network 412 may instead transmit the message digest/hash pattern and digital signature to the issuer system with the authorization request at block 560. In such embodiments, the authentication is performed by the issuer system 420 at block 564 in a manner similar to that described above.

Irrespective of which system performs the authentication, the issuer system 420 may be provided with sufficient information to confirm the authenticity of the authorization request and thus to act on the authorization request. This generally comprises evaluating whether an identified account provides sufficient support for a transaction. For instance, in the case of a debit or stored-value transaction, such an evaluation may confirm that the transaction amount is less than a balance of the identified account; in the case of a credit transaction, the evaluation may confirm that the transaction amount is less than a balance on a credit limit associated with the identified account. The issuer system 420 accordingly returns an authorization response to the payment network 412 at block 568 indicating whether the transaction is approved or denied. This response is routed back to the POS device 404 where the request originated by routing the response to the POS processing system 408 at block 572, with the POS processing system 420 in turn routing the response to the POS device at block 576. Receipt of the response permits the transaction to be completed or declined in accordance with the determination reflected by the response.

Figure 6:
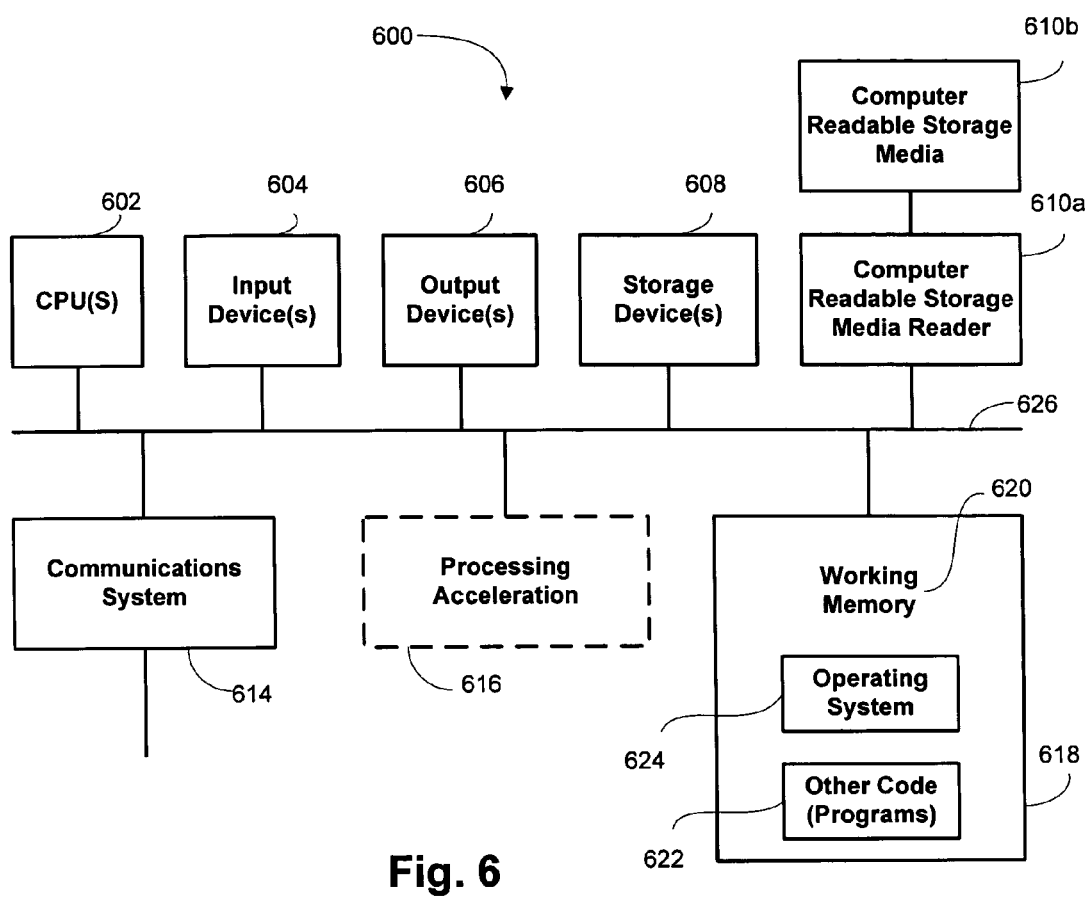
FIG. 6 is a schematic illustration of a computational device on which certain methods of the invention may be implemented.

Many of the systems used in this arrangement may comprise computational systems, and may have a structure like that shown in FIG. 6. Such a structure may be used for the POS processing system 408, the payment network 412, the loyalty system 416 or other adjunct system, and the issuer system. FIG. 6 broadly illustrates how individual system elements may be implemented in a separated or more integrated manner. The computational system 600 is shown comprised of hardware elements that are electrically coupled via bus 626, including a processor 602, an input device 604, an output device 606, a storage device 608, a computer-readable storage media reader 610*a*, a communications system 614, a processing acceleration unit 616 such as a DSP or special-purpose processor, and a memory 418. The computer-readable storage media reader 610*a* is further connected to a computer-readable storage medium 610*b*, the combination comprehensively representing remote, local, fixed, and/or removable storage devices plus storage media for temporarily and/or more permanently containing computer-readable information. The communications system 614 may comprise a wired, wireless, modem, and/or other type of interfacing connection and permits data to be exchanged with other devices.

The computational system 600 also comprises software elements, which are shown as being currently located within working memory 460, including an operating system 624 and other code 622, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of processing a financial transaction initiated by a consumer with a contactless transaction device, the method comprising:

receiving a first electromagnetic transmission from the contactless transaction device, the first electromagnetic transmission providing an identification of a financial account and an adjunct identifier;

electromagnetically transmitting transaction data defining aspects of the financial transaction to the contactless transaction device;

receiving a second electromagnetic transmission from the contactless transaction device, the second electromagnetic transmission providing authentication data and a digital signature originated from the transaction data through application of a cryptographic key maintained on the contactless transaction device;

authenticating the contactless transaction device with an analysis of the authentication data and digital signature;

transmitting an authorization request for approval of the financial transaction over a payment network to an issuer system maintained by or on behalf of an issuer who maintains the financial account;

receiving a response to the authorization request from the issuer system;

transmitting the adjunct identifier to an adjunct system distinct from the issuer system for implementation of functions adjunct to the financial transaction; and acting on the financial transaction in accordance with the response to the authorization request;

wherein the authentication data comprises a pattern resulting from application of a hashing algorithm to the transaction data;

the cryptographic key is a private key of an asymmetric-cryptography public-key-private-key pair;

the digital signature comprises a result of encrypting the pattern with the private key; and authenticating the contactless transaction device comprises:

applying the hashing algorithm to the transaction data to calculate a comparison hash value;

decrypting the digital signature with the public key; and comparing the decrypted digital signature with the comparison hash value.

2. The method recited in claim 1 wherein the adjunct system comprises a loyalty system that maintains records for providing rewards to the consumer for defined transaction activity.

3. The method recited in claim 1 wherein the first electromagnetic transmission comprises a number assigned to the contactless transaction device, a first portion of the number comprising the identification of the financial account and a second portion of the number comprising the adjunct identifier.

4. The method recited in claim 3 wherein the identification of the financial account comprises a bank identification number (BIN) and a primary account number (PAN).

5. The method recited in claim 4 wherein the cryptographic key is one of a plurality of private keys of respective asymmetric-cryptography public-key-private key pairs assigned to the BIN.

6. The method recited in claim 5 wherein the one of the plurality of private keys is defined by a digit of the PAN.

7. The method recited in claim 4 wherein the cryptographic key is a private key of an asymmetric-cryptography public-key-private-key pair associated with all accounts associated with the BIN.

8. The method recited in claim 1 wherein the cryptographic key is a private key of an asymmetric-cryptography public-key-private-key pair associated uniquely with the financial account.

9. The method recited in claim 1 further comprising receiving a response from the adjunct system related to implementation of the functions adjunct to the financial transaction.

10. The method recited in claim 9 further comprising modifying the financial transaction according to the response received from the adjunct system.

11. The method recited in claim 1 wherein the financial transaction comprises a credit transaction that increases an outstanding balance of the financial account.

12. The method recited in claim 1 wherein the financial transaction comprises a debit transaction that decreases a balance of the financial account.

13. The method recited in claim 1 wherein:
the contactless transaction device comprises a magnetic stripe; and
the identification of the financial account is encoded on the magnetic stripe.

14. A method of processing a financial transaction with a contactless transaction device, the method comprising:
transmitting a first electromagnetic transmission from the contactless transaction device to a transaction processing system, the first electromagnetic transmission providing an identification of a financial account to support the financial transaction at an issuer system and an adjunct identifier to be used in implementing functions adjunct to the financial transaction on an adjunct system distinct from the issuer system;
electromagnetically receiving transaction data defining aspects of the financial transaction from the transaction processing system with the contactless transaction device;
deriving authentication data from the received transaction data;
originating a digital signature from the received transaction data through application of a cryptographic key maintained on the contactless transaction device; and
transmitting a second electromagnetic transmission from the contactless transaction device to the transaction processing system, the second electromagnetic transmission providing the authentication data and the digital signature;
wherein deriving authentication data from the received transaction data comprises deriving a pattern by applying a hashing algorithm to the transaction data;
the cryptographic key is a private key of an asymmetric-cryptography public-key-private-key pair;
originating the digital signature the received transaction data comprises encrypting the pattern with the private key.

15. The method recited in claim 14 wherein the first electromagnetic transmission comprises a number assigned to the contactless transaction device, a first portion of the number comprising the identification of the financial account and a second portion of the number comprising the adjunct identifier.

16. The method recited in claim 15 wherein the identification of the financial account comprises a hank identification number (BIN) and a primary account number (PAN).

17. The method recited in claim 16 wherein the cryptographic key is one of a plurality of private keys of respective asymmetric-cryptography public-key-private-key pairs assigned to the BIN.

18. The method recited in claim 17 wherein the one of the plurality of private keys is defined by a digit of the PAN.

19. The method recited in claim 16 wherein the cryptographic key is a private key of an asymmetric-cryptography public-key-private-key pair associated with all accounts associated with the BIN.

20. The method recited in claim 14 wherein the cryptographic key is a private key of an asymmetric-cryptography public-key-private-key pair associated uniquely with the financial account.

21. The method recited in claim 14 wherein:
the contactless transaction device comprises a magnetic stripe; and
the identification of the financial account is encoded on the magnetic stripe.

22. A contact less transaction device comprising:
a support structure;
an antenna maintained in position by the support structure; and
a microprocessor chip maintained in position by the support structure and provided in communication with the antenna, the microprocessor chip storing:
an identification of a financial account to support a financial transaction at an issuer system;
an adjunct identifier to be used in implementing functions adjunct to the financial transaction on an adjunct system distinct from the issuer system; and
a cryptographic key,
wherein the microprocessor chip includes:
instructions to transmit a first electromagnetic transmission to a transaction processing system, the first electromagnetic transmission providing the identification of the financial account and the adjunct identifier;
instructions to electromagnetically receive transaction data defining aspects of the financial transaction from the transaction processing system;
instructions to derive authentication data from the received transaction data;
instructions to originate a digital signature from the received transaction data through application of the cryptographic key; and
instructions to transmit a second electromagnetic transmission to the transaction processing system, the second electromagnetic transmission providing the authentication data and the digital signature;
wherein the instructions to derive authentication data from the received transaction data comprise instructions to derive a pattern by applying a hashing algorithm to the transaction data;
the cryptographic key is a private key of an asymmetric-cryptographic public-key-private-key pair; and
the instructions to originate the digital signature from the received transaction data comprise instructions to encrypt the pattern with the private key.

23. The contactless transaction device recited in claim 22 further comprising a magnetic stripe maintained in position by the support structure, wherein the identification of the financial account is encoded on the magnetic stripe.

24. A transaction processing system comprising:
a point-of-sale device equipped to exchange electromagnetic communications with a contactless transaction device, the point-of-sale device including:
instructions to receive a first electromagnetic transmission from the contactless transaction device, the first electromagnetic transmission providing an identification of a financial account and an identifier;
instructions to electromagnetically transmit transaction data defining aspects of the financial transaction to the contactless transaction device;
instructions to receive a second electromagnetic transmission from the contactless transaction device, the second electromagnetic transmission providing authentication data a digital signature originated from the transaction data through application of a cryptographic key maintained on the contactless transaction device;

a point-of-sale processing system in communication with the point-of-sale device, the point-of-sale processing system including;

instructions to receive the identification of the financial account, the identifier, the transaction data, the authentication data, and the digital signature from the point-of-sale device;

instructions to authenticate the contactless transaction device with an analysis of the authentication data and digital signature;

instructions to transmit an authorization request for approval of the financial transaction over a payment network to an issuer system maintained by or on behalf of an issuer who maintains the financial account;

instructions to receive a response to the authorization request from the issuer system;

instructions to transmit the adjunct identifier to an adjunct system distinct from the issuer system for implementation of functions adjunct to the financial transaction; and instructions to direct the point-of-sale device to act on the financial transaction in accordance with the response to the authorization request wherein the authentication data comprises a pattern resulting from application of a hashing algorithm to the transaction data;

the cryptographic key is a private key of an asymmetric-cryptography public-key-private-key pair;

the digital signature comprises a result of encrypting the pattern with the private key; and the instructions to authenticate the contactless transaction device comprise;

instructions to apply the hashing algorithm to the transaction data to calculate a comparison hash value;

instructions to decrypt the digital signature with the public key; and instructions to compare the decrypted digital signature with the comparison hash value.

25. The transaction processing system recited in claim 24 wherein the adjunct system comprises a loyalty system that maintains records for providing rewards to the consumer for defined transaction activity.

26. The transaction processing system recited in claim 24 wherein the point-of-sale processing system further includes:

instructions to receive a response from the adjunct system related to implementation of functions adjunct to the financial transaction; and instructions to modify the financial transaction according to the response received from the adjunct system.

* * * * *